United States Patent [19]
Stalego

[11] 3,920,429
[45] Nov. 18, 1975

[54] STREAM FEEDER FOR MAKING GLASS FIBERS

[75] Inventor: Charles J. Stalego, Newark, Ohio

[73] Assignee: Owens-Corning Fiberglas Corporation, Toledo, Ohio

[22] Filed: May 28, 1974

[21] Appl. No.: 474,295

[52] U.S. Cl. .............................. 65/1; 13/6; 65/345; 65/356; 65/DIG. 4
[51] Int. Cl.² ........................................ C03B 37/02
[58] Field of Search ............ 65/136, 1, 2, 337, 374, 65/345, 356, DIG. 4; 13/6

[56] References Cited
UNITED STATES PATENTS

| | | |
|---|---|---|
| 2,465,283 | 3/1949 | Schlehr .................................. 65/1 |
| 3,248,191 | 4/1966 | Canfield .................................. 65/1 |
| 3,294,503 | 12/1966 | Machlon et al. ........................ 65/1 |
| 3,628,930 | 12/1971 | Harris ................................ 65/136 X |
| 3,765,852 | 10/1973 | Shule et al. .............................. 65/1 |

Primary Examiner—Robert L. Lindsay, Jr.
Attorney, Agent, or Firm—Carl G. Staelin; John W. Overman; Ronald C. Hudgens

[57] ABSTRACT

An electrically heated stream feeder for producing glass filaments comprising a chamber having an opening for supplying glass marbles for conversion to a molten body, a bottom wall for the chamber having orifices for discharging molten glass as streams, upstanding sidewalls for the chamber where the interior surface of at least one of the upstanding walls has raised portions to provide increased surface area for heat transfer, and a perforated heating strip extending across the chamber in spaced relation above the bottom wall, such heating strip including at least a portion inclined downwardly to one of the upstanding walls to urge unmelted marbles towards such wall.

11 Claims, 15 Drawing Figures

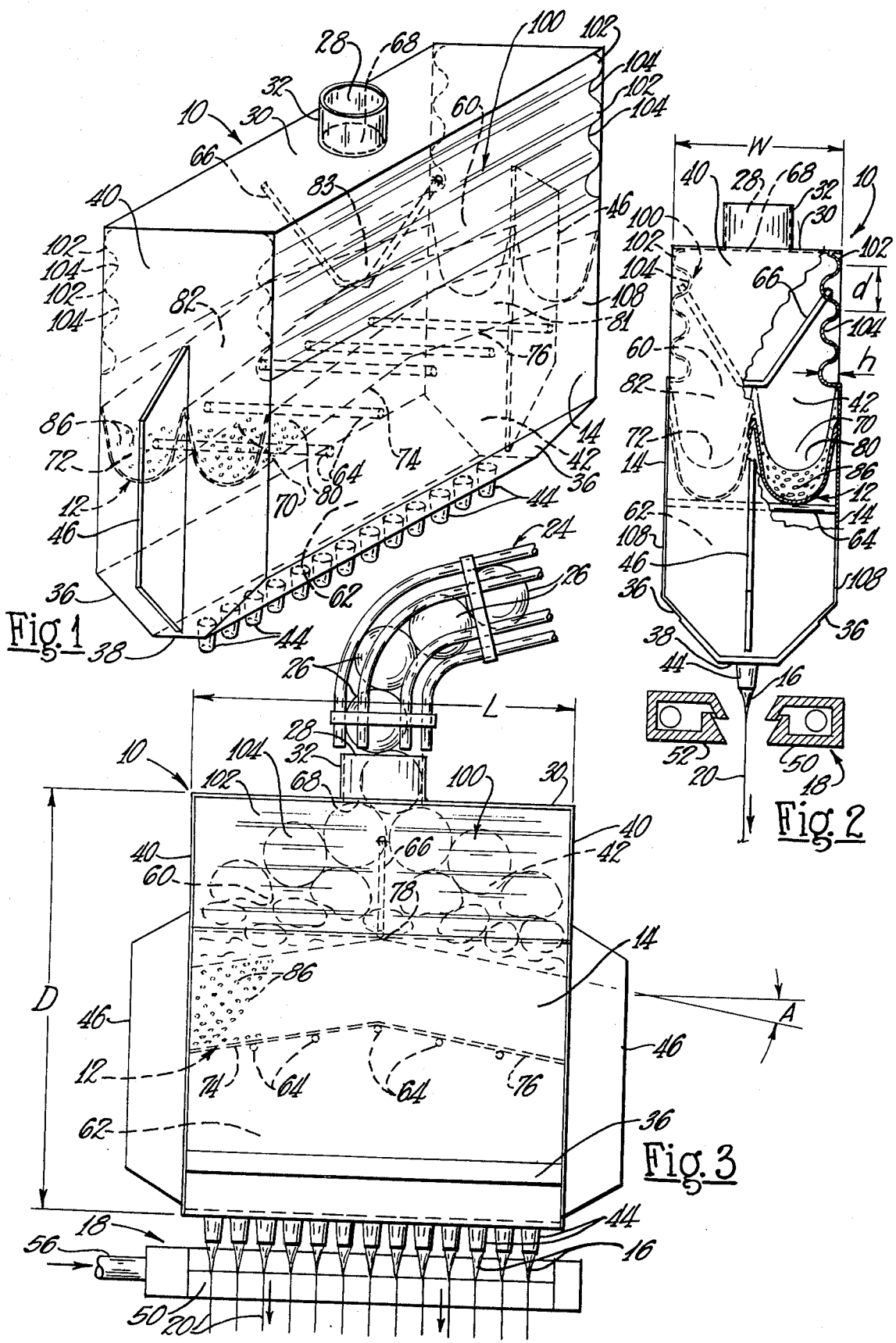

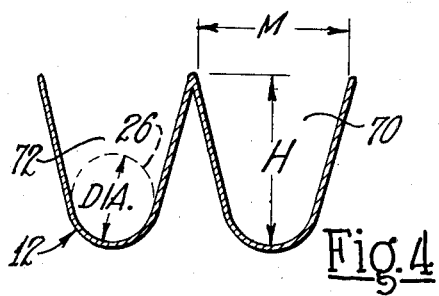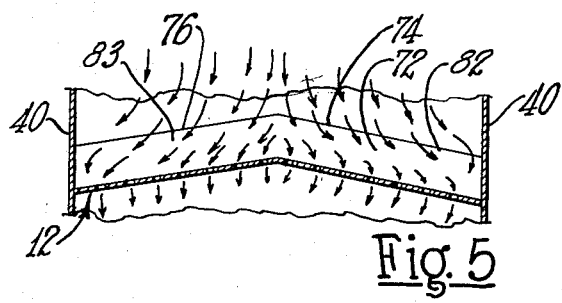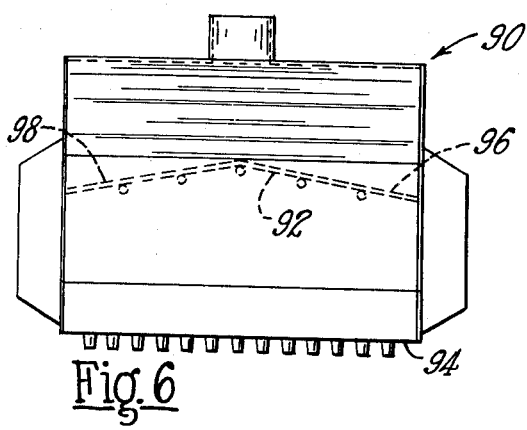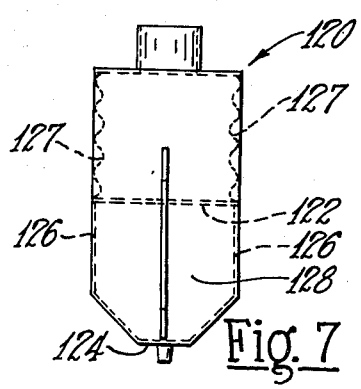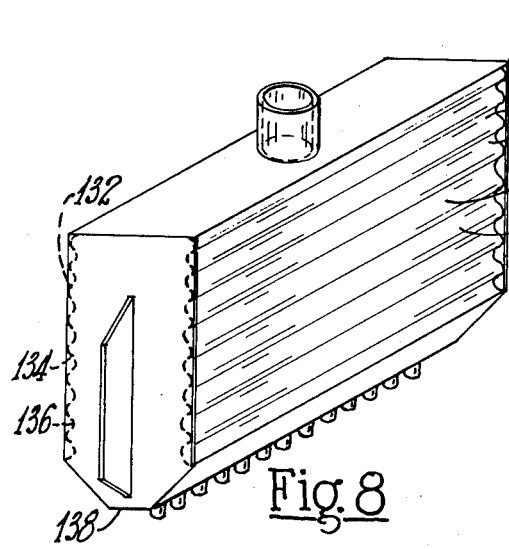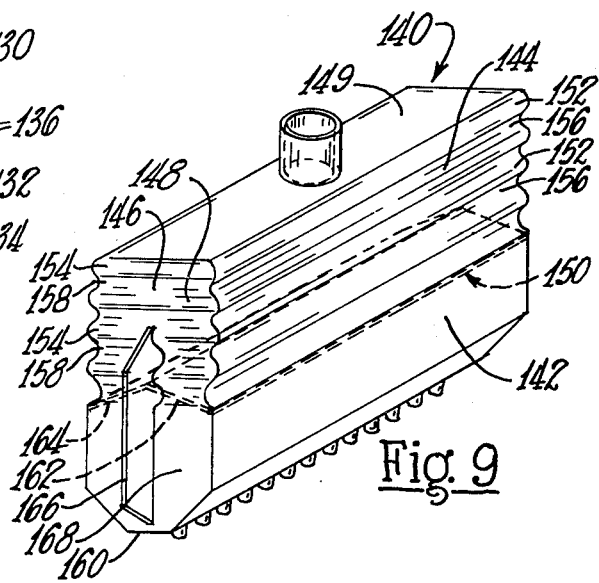

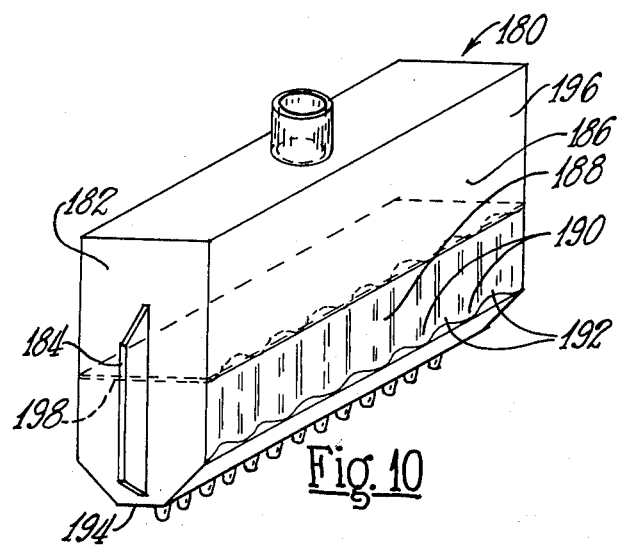
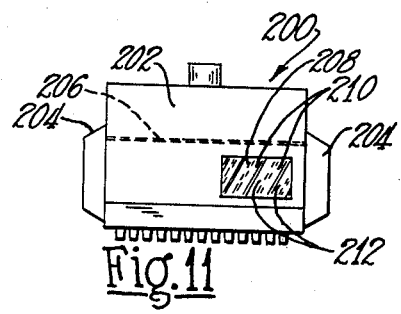
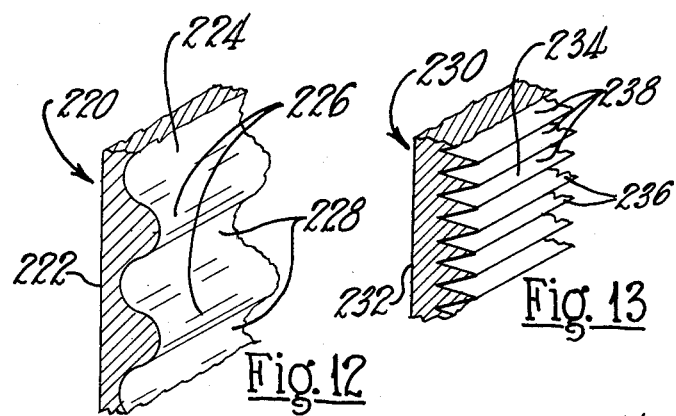
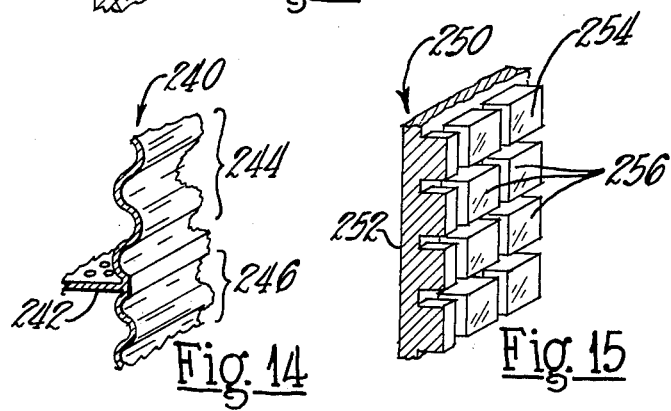

STREAM FEEDER FOR MAKING GLASS FIBERS

BACKGROUND OF THE INVENTION

One type of glass filament forming process uses an electrically heated stream feeder that is fed glass marbles. The heated feeder melts these marbles into a body of molten glass primarily by conduction and radiation and discharges the molten glass as streams. Mechanical or fluid means attenuates the streams into glass filaments.

Competition in glass filament products demands a great deal from marble melting stream feeders. Economic conditions call for marble melting stream feeders that provide increased molten glass throughput to increase glass filament production. And a more demanding community of glass filament product users calls for filament size uniformity in products.

But the goals of both increased production rates and filament size uniformity from marble melt stream feeders conflict with each other. Of course, more feeders will increase glass filament production. But these feeders are normally made from expensive platinum alloys. Therefore greater melting capacity for smaller conventional sized stream feeders presents a more attractive choice.

Melting glass marbles by a stream feeder is a complex and sensitive operation that directly affects the quality of glass filaments produced, especially at higher production rates. For example, introduction of glass marbles to a feeder has a chilling effect that disturbs the temperature pattern of molten glass in the feeder. This disturbance causes viscosity variations in the molten glass streams discharged from the feeder. And these viscosity differences produce glass filaments having undesirable nonuniform diameter variations along their lengths. These nonuniformities tend to become even more pronounced with attempts at higher production rates.

SUMMARY OF THE INVENTION

An object of the invention is improved method of and apparatus for producing filaments of heat-softenable material such as glass.

Another object of the invention is an improved stream feeder capable of increased melting rates.

Yet another object is an improved glass marble melting stream feeder providing more uniform thermal conditions during production of glass filaments.

The above and other objects and advantages will become more apparent as the invention is described in more detail with reference made to the accompanying drawings.

DESCRIPTION OF THE DRAWINGS

FIG. 1 is an isometric view of a glass marble melting stream feeder according to the principles of the invention. The feeder is illustrated with an internal melting strip or element sloping downwardly towards the end walls and with sidewalls having corrugated upper portions.

FIG. 2 is an end elevation of the feeder shown in FIG. 1. Below the feeder is a blower that directs gaseous blasts to attenuate glass filaments from molten glass streams emitted from the feeder. The blower is shown in section.

FIG. 3 is a front elevation of the feeder and blower of FIGS. 1 and 2.

FIG. 4 is a section of the heating element in the feeder of FIGS. 1-3. The size of the element is compared with one of the marbles supplied to the feeder.

FIG. 5 is a showing of the general marble and molten glass movement at the heating element in the feeder shown in FIGS. 1-3 during marble melting in filament forming operations.

FIG. 6 is a front elevation of a glass marble melting stream feeder like the one shown in FIGS. 1-3 except for the heating element. The feeder of FIG. 6 has a sloping heating element formed by two perforated flat planar portions.

FIG. 7 is an end elevation of a glass marble melting stream feeder like the one shown in FIGS. 1-3 except for the heating element. The feeder of FIG. 7 has a perforated flat heating element.

FIG. 8 is an isometric view of a glass marble melting stream feeder like the one shown in FIGS. 1-3 except for the sidewall construction. The feeder of FIG. 8 has vertical sidewalls that are fully corrugated.

FIG. 9 is an isometric view of a glass marble melting stream feeder like the one shown in FIGS. 1-3 except for the end walls. In FIG. 9 each of the end walls of the feeder has an upper corrugated portion.

FIG. 10 is an isometric view of a glass marble melting stream feeder like the feeder shown in FIGS. 1-3 except for the sidewall construction. The feeder of FIG. 10 includes sidewalls each having a lower corrugated portion below the heating element or strip. The corrugated portions have rounded ridges and grooves running vertically.

FIG. 11 is a front elevation of a stream feeder like the one shown in FIG. 7 except for the sidewall construction. The feeder of FIG. 11 has sidewalls with small corrugated temperature control patches.

FIG. 12 is an isometric view of a portion of a feeder wall according to the principles of the invention.

FIG. 13 is an isometric view of a portion of another feeder wall according to the principles of the invention.

FIG. 14 is an isometric view of a portion of a feeder wall and heating element according to the principles of the invention.

FIG. 15 is an isometric view of a portion of still another feeder wall according to the principles of the invention.

DESCRIPTION OF THE PREFERRED EMBODIMENTS

The method and apparatus of the invention are particularly valuable in processes for forming filaments of heat-softenable mineral material such as glass. But the invention is also useful in operations for forming filaments from other thermoplastic filament forming material such as nylon, polyester and polyethylene.

FIGS. 1-3 show a glass filament forming operation including an electrically heated glass marble melting stream feeder 10 including a heating element or strip 12 and upstanding sidewalls 14 that incorporate features according to the principles of the invention. The features promote larger and more uniform heating and melting capacity for the feeder 10.

The stream feeder 10, which is made of electrically conductive and high temperature resistant material such as an alloy of platinum, discharges molten glass as streams 16. Gaseous blasts from a slotted blower 18 immediately below the feeder 10 attenuates the molten glass streams 16 downwardly into glass filaments 20.

A chute 24 guides glass marbles 26 to the feeder 10 for melting through a supply passageway or opening 28 in the roof or top wall 30 of the feeder 10. As shown in FIGS. 1–3 an upstanding tubular member 32 on the roof 30 defines the marble supply opening 28.

The chute 24 connects to a suitable source of marbles, such as marble holding hoppers, which are not shown in the figures.

The feeder 10 includes: the top wall 30, vertical sidewalls 14, converging sidewalls 36, a bottom wall 38 and vertical end walls 40. These walls define a generally rectangular chamber 42 within the feeder.

The bottom wall 38 has orifice openings or passageways for delivering the streams 16 of molten glass from the feeder 10. As shown one straight row of depending orificed projections or tubular members 44 form the orifice openings.

Electric terminals 46 are on the end walls 40 of the feeder 10. These terminals connect to a source of electrical energy effective to heat the feeder 10 by conventional resistance heating. The electrically heated feeder 10 melts glass marbles 26 supplied to it to form a body of molten glass. The molten glass is discharged through the orificed projections 44 of the feeder 10 as the streams 16.

The slotted blower 18 is an assembly that includes opposed blower halves 50 and 52. Each of these halves includes a row of jet or nozzle openings. And each of the blower halves is supplied suitable fluid under pressure (for example, steam, air or other gaseous blowing media) from a source through a supply tube (such as supply tube 56 shown in FIG. 3). The blower 18 releases the blowing fluid as downwardly directed blasts effective to attenuate the streams 16 downwardly into the filaments 20. U.S. Pat. No. 2,206,060 describes a suitable blower for use in attenuating the streams 16.

In practice refractory material surrounds the feeder 10 to reduce heat loss during filament forming operations. But for ease of discussion and illustration the figures do not show the refractory.

The heating strip 12 is joined to the walls within the feeder 10 and is for melting the glass marbles. The heating strip 12 extends across the interior of the feeder 10 in spaced relation above the bottom wall 38. Therefore the strip 12 divides the chamber 42 of the feeder into an upper space or region 60 and a lower space or region 62. The upper region 60 is a melting chamber; the lower region 62 is a reservoir chamber for molten glass. Molten glass in the lower chamber 62 leaves the feeder through the orificed projections 44 to emerge as the stream 16.

The heating strip 12, like the walls of the feeder 10, is normally made of an alloy of platinum. But the strip is usually thicker than the walls of the feeder. So when the feeder 10 is electrically energized, the heating strip 12 becomes hotter than the feeder walls.

The heating strip 12 rests on support members 64; hanger 66 provides support for the heating strip 12 from above.

The heating strip 12 is spaced a sufficient distance below the outlet orifice 68 of the marble supply opening 28 that the marbles 26 can accumulate in stacked relationship above the strip 12. Normally this distance is from 3–5 marble diameters below the marble outlet orifice 68.

The shape of the heating strip 12 is formed to define two side-by-side parallel extending elongated channels 70 and 72 of the same dimensions running lengthwise within the feeder 10. And the heating strip 12 includes two portions 74 and 76, each sloping downwardly away from each other from the strip's mid-region 78 (directly under the marble outlet orifice 68) to the end walls 40. So the elongated channels 70 and 72 each include two inclined sections, sections 80 and 81 and sections 82 and 83 respectively. The downwardly sloped or inclined portions of the heating strip 12 urge the glass marbles 26 along the channels 70 and 72 away from the center region 78 of the strip 12 towards the end walls 40 during melting.

The strip 12 is perforated to have small openings 86. So molten glass from melting marbles above the strip 12 can flow downwardly into the lower reservoir section 62. The openings 86 are small enough so that molten glass moving through them is at desired filament attenuation viscosities (temperatures). The smallness of the openings 86 discourages higher viscosity portions of the marbles 26 from moving downwardly into the lower reservoir section 62. Normally the openings 86 are in the range of from 1/16 to 1/32 of an inch for a normal operating temperature range of from 2350° to 2450°F used in most blower attenuation processes.

The channels 70 and 72 are curved at their bottom regions. As shown the bottom regions are formed with a hemispherical curve having a diameter substantially equal to the diameter of the marbles 26 supplied to the feeder 10. This relationship is shown in FIG. 4. As shown the channels become progressively larger towards their upper regions. The width dimension of the channels is denoted by the reference letter M. M is normally from 15–25 percent larger than the diameter of the bottom regions of the channels. In practice, it has been found useful at times to make the diameter of the curved bottom region a little larger than the diameter of the marbles 26 supplied to the feeder 10; preferably the diameter is not more than 15 percent larger than the diameter of the marbles.

The depth or height H (FIG. 4) of the channels 70 and 72 is shown larger than the diameter of the marbles supplied to the feeder.

Since the marbles 26 accumulate in stacked relation above the heating strip 12 during melting, marbles nearer the bottom of the stack (closer to the heating strip 12) are hotter. Therefore they melt before the marbles higher in the stack. The marbles become hotter and hotter as they move progressively downwardly in the stack. Fusing or merging of the marbles begins to occur under the intense heat in the feeder; they take on more the form of a molten body of glass with regions of higher and lower viscosities. Finally a homogenous refined body of molten glass forms in the region immediately above the lower regions of the channels 70 and 72 of the heating strip 12 and the molten glass flows through the strip 12 to the reservoir section 62 below.

As the nonhomogenous body of glass moves into the channels 70 and 72, it comes under the concentrated influence of radiation from the strip 12. The surface portions defining each of the channels combine to concentrate their radiation in their respective channel. Refinement of the glass occurs.

Also, the curved channel shape and dimensions of the heating strip 12 promotes melting that provides a molten glass body of uniform viscosity.

The inclined disposition of the heater strip 12 (portions 74 and 76) urges marbles towards the hotter melting regions nearer the end walls 40. As the unmelted marble portions in and immediately adjacent the channels continue to melt, they move lengthwise of the channels 70 and 72 towards the end walls 40. The weight of marbles in the stack above the heating strip 12 assists marble movement lengthwise of its channels. The unmelted marble portions become smaller and smaller as they move towards the end walls 40. So alot of final glass refinement occurs at the lower ends of the channels 70 and 72 nearer the end walls 40. FIG. 5 indicates with arrows general marble and molten glass movement in the feeder 10 during melting.

The inclination of the heating strip 12 is preferably such that it effects small marble shifts in the stack during melting that occur at closely spaced intervals. This gradual, rather substantially continuous, movement of marbles downwardly during melting effects a slow introduction of marbles 26 into the feeder 10. This results in increased thermal stability throughout the entire feeder 10. This means that molten glass of substantially the same viscosity (temperature) is provided during filament forming operations.

A slop of from 10 to 12 degrees below the horizontal (Angle A in FIG. 2) has given good results for feeders like the one shown in FIGS. 1–3 having: a depth between 7 and 8 inches (D in FIG. 2); a length between 7 and 8 inches (L in FIg. 2) and a width of between 2 and 3 inches (W in FIG. 3). The slope (Angle A) generally needs to be larger for bigger feeders requiring longer inclined heating strip portions.

In a broad sense a feeder including a heating strip according to the principles of the invention has at least a portion sloping downwardly to an upstanding wall of the feeder to urge mineral material, such as unmelted glass portions, towards the upstanding wall. For example, FIG. 6 shows another embodiment of the invention. A glass marble melting stream feeder 90 has a heating strip 92 in spaced relation above the bottom wall 94. The strip 92 includes two perforated planar portions 96 and 98 each inclined downwardly away from the other portion to the end walls of the feeder.

The embodiment shown in FIG. 6 might be modified to include a heating strip comprising two perforated planar portions each inclined downwardly away from other portions to the sidewalls of a feeder (see FIG. 9) or a heating strip might be used having two generally opposed pairs of perforated members where each of the pairs is inclined downwardly from an apex region away from its generally opposed portion to an upstanding wall (sidewall or end wall). Such a heating strip would have a pyramid-like shape.

Referring again to FIGS. 1–3, the sidewalls 14 of the feeder 10 each includes a corrugated portion 100 above the heating strip 12 to provide increased heat transfer surfaces for the melting region 60. The corrugated portions 100 have corrugations that include elongated curved ridges 102 and grooves 104 oriented to extend between the end walls 40. The ridges 102 and grooves 104 are shown extending in a direction parallel to the bottom wall 38.

The lower portions 108 of each of the sidewalls 14 are straight or planar.

The corrugated portions 100 of the sidewalls 14 draw more electric current during energization of the feeder 10. This occurs because the cross sectional area of the corrugated portions 100 is larger in the direction of current flow (which is between the terminals 46) than the noncorrugated lower portions 108. And since a conductor (or conductor portion) that has a greater cross sectional area provides less resistance per unit length, more electric current flows through the corrugated portions 100 than the lower portions 100 during operation of the feeder 10.

The thickness of the sidewalls below the heating strip 12 is shown uniform throughout. But it may be advantageous to vary the thickness of the wall in this region to obtain a desired heat pattern. For example, the wall 14 may be progressively thicker at its lower regions below the heating strip 12.

In practice the corrugated portions 100 of the sidewalls 14 are heated by electric current to substantially the same temperature as the lower planar portions 108, but provides more heat to the upper marble melting chamber 60. The interior heat transfer surfaces of the corrugated portions 100 are larger than the interior surface of the planar portions 108 because of the ridges 102 and grooves 104. So more heat is transferred to the glass in the melting chamber 60 by the corrugated portions 100. And the amount of heat can be controlled by the size and number of the ridges 102 and grooves 104. In practice ridges having a height h (FIG. 3) of from ⅛ to ½ inch have given good results where the ridges are spaced apart a distance d (FIG. 3) of from ½ to 1 inch and the wall thickness is about 0.030 of an inch.

FIG. 6 shows the feeder 90, which is like the feeder 10 except for the heating element 92.

FIG. 7 shows a glass marble melting stream feeder 120 that is like the feeder 10 except for its heating strip. Feeder 120 has a perforated flat heating strip 122 disposed parallel to the bottom wall 124. The uniformly thick sidewalls 126 each have an upper corrugated sidewall portion 127 that extends from the top of the feeder 120 downwardly to the upper surface of the heating strip 122. The elongated ridges and grooves of the corrugated portions 127 extend between the end walls 128 in a direction parallel to the bottom wall 124.

FIG. 8 shows another feeder, feeder 130, according to the principles of the invention. Feeder 130 is like the feeder 10 except for its upstanding sidewalls 132. These sidewalls, which have a uniform thickness, are corrugated their entire height. Its rounded ridges 134 and grooves 136 run parallel to the bottom wall 138 just like the ridges 102 and 104 of feeder 10. So these corrugations provide a greater heat transfer surface for both the upper melting region and the lower reservoir region of the feeder 130. Therefore for the same wall temperature more heat is transferred to glass in the feeder 130 than would occur with a feeder having planar upstanding sidewalls.

FIG. 9 illustrates another glass marble melting stream feeder, feeder 140, according to the principles of the invention. This feeder includes uniformly thick vertical sidewalls 142 that are like the sidewalls 14 of the feeder 10. That is the upstanding sidewalls 142 each have an upper corrugated portion 144 for the upper marble melting chamber or region just like the feeder 10. But additionally, the feeder 140 has end walls 146 each with an upper corrugated portion 148 for the melting region. The corrugated portions 144 and 148 are from the top wall 149 downwardly along their respective sidewalls and end walls to the upper surface of the feeder's perforated heating strip 150. And the corrugated portions 144 and 148 have elongated rounded ridges 152 and 154 respectively separated by elongated grooves 156 and 158 respectively; these corrugations extend parallel to the bottom wall 160 and are the same size.

The heating strip 150 includes two inclined portions 162 and 164. These portions are inclined downwardly to the sidewalls 142.

Terminals 166 are on the end walls 168.

The corrugated portions 144 draw more electric current than the lower remainder and planar portions of the sidewalls 142 because the corrugated shape of the wall provides a larger cross sectional area in the direction of current flow. But the ridges 154 and grooves 158 of the corrugated portions 148 extend across the direction of current flow between the terminals 166 and across the top wall 149. Therefore the corrugated configuration presents increased conductor length (not increased cross section). And increased length increases resistance. Consequently, less electric current flow between the terminals 166 through the top wall 149 than between the terminals 166 through the portions 144.

So it can be seen that feeder walls can be configured to control flow of electric current and to provide an increased internal heat transfer surface.

FIG. 10 shows still another glass marble melting stream feeder, feeder 180, according to the principles of the invention. Feeder 180 has uniformly thick planar end walls 182 with terminals 184 and uniformly thick vertical sidewalls 186, each having a corrugated portion 188. The elongated rounded ridges 190 and grooves 192 of the corrugated portion 188 run in a direction normal (vertical) to the bottom wall 194 of the feeder 180. So the corrugated portions 188 like the corrugated end wall portions 148, discourage flow of electric current betweenn the terminals 184. Hence the upper planar wall portions 196 of the sidewalls 186 draw more current; therefore, they are heated to a higher temperature than the corrugated portions 188.

The feeder 180 is shown with a planar heating strip 198 that extends in a plane parallel to the bottom wall 194.

FIG. 11 illustrates another glass marble melting stream feeder according to the principles of the invention. A marble melting stream feeder 200 is shown having: upstanding sidewalls 202, terminals 204 on the end walls and a perforated flat horizontal heating strip 206. The sidewalls 202 each have a corrugated patch or region 208 below the heating strip 206. The rounded ridges 210 and grooves 212 of the corrugated patches 208 extend in an oblique fashion, that is more vertically oriented than horizontal. Therefore the patches 208 present a greater resistance to electric current flowing between the terminals 204 through the sidewalls 202. Hence, during filament forming operations the patches 208 would tend to be cooler than the surrounding regions of the sidewalls 202. Of course, the amount of slope for the ridges 210 and grooves 212 can be modified to obtain the degree of resistance desired for current flowing between the terminals 204 through the sidewalls 202. For example, ridges 210 and grooves 212 can be disposed horizontally to minimize resistance, under this disposition of the corrugations the patches 208 would tend to become hotter than the surrounding regions of the sidewalls 202.

Hence, it is apparent the wall portion patches can be used to make minor temperature variations at desired regions of a stream feeder to control glass temperature.

FIG. 12 illustrates a wall portion 220 for a stream feeder like those shown in the figures. The portion 220 has a planar exterior surface 222 and a corrugated interior surface 224 with elongated rounded ridges 226 and grooves 228. So, like the other corrugated wall portions of stream feeders discussed herein, a wall configured like the portion 220 provides a larger heat transfer surface. But unlike the other corrugated wall portions the thickness of the wall varies.

FIG. 13 illustrates a wall portion 230 for a stream feeder like those discussed. The portion 230 has a planar exterior surface 232 and an interior surface 234 having spaced apart tapered blade-like ridges 236 and grooves 238.

The ridges and grooves of the wall portions 220 and 230 can be oriented as discussed in relation to the corrugated wall portions of the stream feeders discussed herein.

FIG. 14 illustrates a wall portion 240 and a heating strip 242 for a stream feeder like those discussed. The wall portion has a uniform thickness and is corrugated. But the corrugations 244 (ridges and grooves) above the heating strip 242 are larger than the corrugations 246 (ridges and grooves) below the strip 242. This type of wall can be used on a stream feeder like the feeder 130 shown in FIG. 8. The corrugations below the heating strip are associated with the reservoir region of the feeder and the corrugations above are associated with the marble melting region. Therefore more heat is transferred to material in the melting region of the feeder.

FIG. 15 shows a wall portion 250 for a stream feeder like those disclosed herein. The portion 250 has a planar exterior wall surface 252 and an interior wall surface 254 having discrete raised portions 256 shown as cube-like projections. These projections provide a greater heat transfer surface.

A stream feeder including walls with raised portions provides increased surface area for heat transfer. And this is extremely important in converting mineral material, such as glass marbles, to a heat-softened condition. Cold mineral material in the form of marbles can send thermal shudders through a bushing. But increased heat transfer capacity from increased interior surface areas can in a real sense overcome these tendencies to thermal changes. More uniform temperatures, and hence viscosities, are kept throughout filament forming operations.

While the apparatus disclosed herein has shown feeders for melting glass marbles other forms of material might be supplied. For example, glass portions such as cullet or raw batch material might be supplied to feeders according to the principles of the invention.

I claim:

1. An electrically heated stream feeder for supplying heat-softened glass in filament forming condition comprising:
    a chamber having an opening for supplying portions of unmelted glass for conversion to a heat-softened flowable body of glass;
    a bottom wall for the chamber having at least one orifice for discharging heat-softened glass as a stream;
    two pairs of opposed generally upstanding walls for the chamber;
    means for supplying electrical current to the feeder; and
    a perforated current conducting heating strip extending across the chamber in spaced relation above the bottom wall for converting the portions of glass into a heat-softened flowable body, such heating strip including at least a portion sloping downwardly to one of the generally upstanding walls, the portion defining an elongated channel sloping downwardly to the one generally upstanding wall, the sloping portion urging the glass portions towards such one upstanding wall along the channel during glass melting.

2. An electrically heated stream feeder for supplying heat-softened glass in filament forming condition comprising:
- a chamber having an opening through which glass marbles are supplied thereto for melting to a heat-softened flowable body;
- means for supplying marbles to the chamber through the opening;
- a bottom wall for the chamber having orifices for discharging the heat-softened glass as streams;
- generally upstanding walls for the chamber;
- means for supplying electrical current to the feeder; and
- a perforated current conducting heating strip extending across the chamber between the upstanding walls in spaced relation above the bottom wall for melting the marbles, such heating strip being shaped to define an elongated channel sloping downwardly to one of the generally upstanding walls to direct the glass marbles supplied to the chamber towards such one upstanding wall during glass marble melting.

3. The feeder of claim 2 in which the means for supplying marbles supplies marbles having diameters smaller than the depth and width of the channel.

4. The feeder of claim 3 in which the chamber has a top wall having the marble supply opening and where the elongated channel slopes from a location directly under the supply opening to the one upstanding wall.

5. An electrically heated stream feeder for supplying streams of molten glass comprising:
- a pair of opposed spaced apart current conducting sidewalls;
- a pair of opposed spaced apart current conducting end walls that are joined to the sidewalls;
- a current conducting bottom wall joined to the sidewalls and end walls, the bottom wall having orifices for discharging molten glass streams from the feeder;
- a current conducting top wall having a supply opening mid-way between the sidewalls and end walls through which glass marbles are supplied to the interior of the feeder for melting;
- electric terminals in the end walls through which electric current is supplied to the feeder for heating it to melt the glass marbles; and
- a perforated current conducting heating strip joined to the sidewalls and end walls and extending across the interior of the feeder above the bottom wall to divide the interior of the feeder into an upper marble melting region and a lower reservoir feed region for molten glass, the heating strip being shaped to define two side-by-side elongated channels extending between the end walls, each of the channels including two sections each inclined downwardly away from each other from a region under the marble supply opening midway between the end walls to an end wall, marbles being urged to move towards the end walls during marble melting.

6. The stream feeder of claim 5 in which the heating strip is located below the marble supply opening a sufficient distance that marbles accumulated in stacked-relation above the strip.

7. The stream feeder of claim 6 in which the inclined sections of the elongated channels are inclined such that marbles at the strip are moved substantially continuously towards the end walls during marble melting.

8. The stream feeder of claim 7 in which the sections of the elongated channels are inclined between 10°–50° below the horizontal.

9. The stream feeder of claim 6 in which the elongated channels have a curved bottom region.

10. The stream feeder of claim 5 in which the channels extend parallel to each other.

11. The stream feeder of claim 10 in which the channels are inclined downwardly at the same angle.

* * * * *